United States Patent [19] [11] 4,438,470
Sawada et al. [45] Mar. 20, 1984

[54] MAGNETIC HEAD OF MAGNETIC RELUCTANCE EFFECT TYPE AND A METHOD FOR MAKING THE SAME

[75] Inventors: Takeshi Sawada, Yokohama; Ko Yoneda; Akira Shinmi, both of Kawasaki; Hirokazu Goto, Tokyo; Shuzo Abiko, Chichibu, all of Japan

[73] Assignees: Canon Kabushiki Kaisha, Tokyo; Canon Denshi Kabushiki Kaisha, Saitama, both of Japan

[21] Appl. No.: 284,708

[22] Filed: Jul. 20, 1981

[51] Int. Cl.³ .................. G11B 5/12; G11B 5/30; G11B 5/42; H01F 7/06
[52] U.S. Cl. .................. 360/113; 29/603; 360/126
[58] Field of Search ............ 360/113, 112, 126, 121, 360/123, 122; 338/32 R; 29/603

[56] References Cited
U.S. PATENT DOCUMENTS

| 3,260,980 | 7/1966 | Weiss | 360/113 |
| 4,047,236 | 9/1977 | Lee | 360/113 |
| 4,051,542 | 9/1977 | Kanai | 360/113 |
| 4,071,868 | 1/1978 | Kaminaka | 360/113 |
| 4,251,910 | 2/1981 | Griffith | 29/603 |
| 4,277,808 | 7/1981 | Nagaki | 360/126 |
| 4,320,428 | 3/1982 | Somers | 360/123 |
| 4,376,337 | 3/1983 | Kobayasi | 29/603 |

Primary Examiner—Robert Martin Kilgore
Attorney, Agent, or Firm—Fitzpatrick, Cella, Harper & Scinto

[57] ABSTRACT

A process for making magnetic reluctance effect type magnetic heads comprises forming the magnetic sensor, first lead and second lead sections in series by use of the same material. The noise in the magnetic head is reduced, yet the output is increased by making the first lead section of a width larger than that of the magnetic sensor and second lead sections. The reproducing sensitivity of the magnetic head is increased by forming a plurality of magnetic sensor sections in series within a rectangular area. The control of the magnetic characteristics of the head are controlled for providing less dispersion by providing a substrate on which a magnetic reluctance effect type material varying in electric resistance in response to any magnetic field is formed into a film, the substrate being optionally etched by the use of photolithography to form the magnetic sensor sections, the first lead section and the second lead section on the substrate in given configurations.

3 Claims, 6 Drawing Figures

MAGNETIC HEAD OF MAGNETIC RELUCTANCE EFFECT TYPE AND A METHOD FOR MAKING THE SAME

BACKGROUND OF THE INVENTION

1. Field of the Invention

This invention relates to a magnetic head utilizing a magnetic reluctance effect element for converting magnetic signal fields in magnetic tapes or disks to electric signals and a method for making such a magnetic head.

2. Description of the Prior Art

Attention has been recently directed to a magnetic resistive element (called "MR element" hereinafter) which can be used as a material for magnetic heads, because it can be relatively simply manufactured and is suitable for integration. Various magnetic heads having such MR elements have been developed. FIG. 1 shows a typical MR magnetic head of the simplest structure which comprises an MR element 101 formed in a firm by the use of a film depositing method such as resistance heating deposition, electron beam deposition, spattering, plating, chemical vapor deposition or other methods. The MR element is shaped by means of photolithography which has been well known in the art as a technique for processing integrated circuis (IC). The MR element can be shaped also by mask vapor deposition. The MR element has a suitable thickness in the range of 0.02–0.1 μm which is actually determined by taking account of its chemical stability and electric resistance. The MR element is made of permalloy containing about 80% of nickel of nickel-cobalt alloy. The so obtained MR element has a resistance taper rate of 1–2% in the magnetic field of 5–100 oersteds.

FIG. 1 also shows lead wires 102a and 102b which are connected with the opposite ends of the MR element. The other ends of the lead wires are connected with a circuit (not shown) for reading variations in voltage when a constant current is supplied to the MR element. These lead wires are made of aluminium, copper, gold or other conductors by the use of similar film depositing method and then shaped by the use of photolithography.

The resistivity of the film-like MR element is in the range of 20 to 30 μΩ·cm while that of the film-like lead wires is in the range of 2.5 to 4 μΩ·cm. The resistivity of the lead wires may be even smaller if they are of aluminium, gold and copper. Roughly calculating, the lead wires becomes about 1/150 of the MR element in resistivity when the MR element has a thickness of about 0.05 μm and the lead wires have a thickness of about 1 μm. This means that almost the total amount of supplied current is fed to the MR element through the lead wires 102a and 102b.

The magnetic head shown in FIG. 1 also includes a substrate 103 of glass, silicon or other materials on which the MR element 101 and the lead portions 102a, 102b are secured. Reference numerals 104 and 105 designate a recording medium and a base to which the recording medium is applied, respectively. Arrows 106 denote directions of magnetization lines which are recorded in the recording medium.

The MR element 101 is moved in contact with the magnetically recording surface of the recording medium so that the resistance thereof will be varied depending upon magnetic signal fields produced from the magnetization lines 106 of the recording medium. If a constant current is supplied to the MR element, such variations in resistance would appear at the lead wires in the form of variations in voltage corresponding to the recorded information. Such an MR element has many features in that it has a temperature coefficient smaller than that of prior art Hall element, that it can be simply manufactured, that it has a simple structure suitable for integration, and so on. Moreover, it has an advantage in that magnetic signals can be properly reproduced even at a variable relative speed without depending on the speed relative to the recording medium as in induction type heads.

However, such a useful MR element also has the following disadvantages:

(1) Although the MR element has a simple construction, a complicated process must be carried out for making it. In other words, the process comprises various steps of forming the lead portions in addition to the MR element in a film-deposition manner, shaping the lead portions by the use of an etching technique and then shaping the MR element by further etching.

(2) If the lead members are made of copper or gold, the permalloy material of the MR film is significantly affected in etching the lead portions. This results in difficulties in controlling the magnetic characteristics.

(3) If lead members of aluminium, copper or gold are deposited in a film on the MR film, the magnetic fields present upon heating, chemical reaction and vapor-deposition, particularly in spattering cause substantial variations in the magnetic characteristics of the MR film, already formed, such as direction and magnitude in the magnetic anisotropism, electric resistivity, resistance taper rate, saturated magnetic flux density and coercive force. This effect causes a dispersion in the sensor characteristics.

SUMMARY OF THE INVENTION

It is a first object of this invention to provide a method for making magnetic reluctance effect type magnetic heads, the steps of which are simplified for shortening time required for production to improve the yield of products and then to decrease the manufacturing cost.

A second object is to provide such magnetic heads in which noise can be decreased and output can be increased.

A third object is to provide such magnetic heads in which in reproducing sensitivity can be improved.

A fourth object is to provide such magnetic heads the magnetic characteristics of which can be easily controlled for reducing the dispersion thereof.

DESCRIPTION OF THE PREFERRED EMBODIMENT

This invention provides a magnetic head having a structure that comprises a magnetic sensor section including an MR element associated therewith, first lead portions for supplying electric power to the magnetic sensor section to conduct voltages variable in response to the information on a magnetic recording surface to any processing circuit, and second head portions electrically connecting the first lead portions with the magnetic sensor section, these sensor and lead portions being made of the same material and connected in series with one to another.

Embodiments of this invention will now be described in detail with reference to the accompanying drawings.

Figure 1:
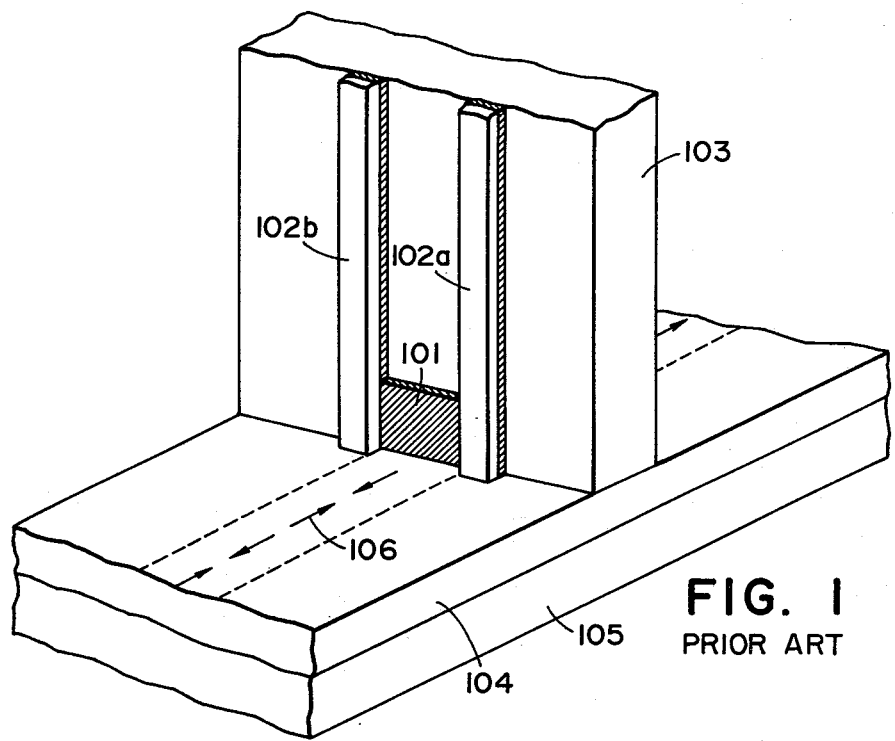
FIG. 1 is a perspective view, partially broken, showing the structure of an MR type magnetic head which is constructed according to the prior art.
Figure 2:
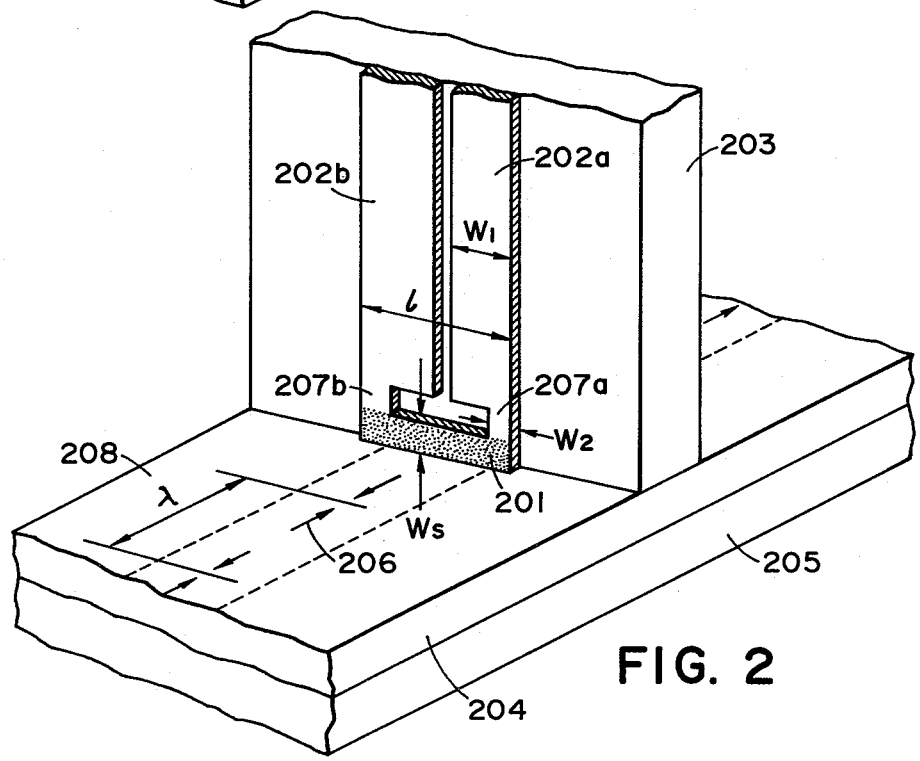
FIG. 2 is a perspective view, partially broken, showing the structure of an MR type magnetic head constructed according to this invention.

A magnetic head shown in FIG. 2 comprises an MR element 201 and first lead portions 202a and 202b for transmitting voltage signals corresponding to magnetic signal fields to a processing circuit. The MR element is connected in series with the first lead portions through second lead portions 207a and 207b. The MR element and lead portions are vapor-deposited in a film on a substrate 203 to form substantially a U-shaped configuration. In FIG. 2, reference numerals 204, 205 and 206 designate a magnetic recording medium, a base on which the recording medium is formed, and magnetization lines representing magnetic signals, respectively. The wavelength $\lambda$ of a set of magnetization lines is denoted by 208.

The MR element 201, first lead portions 202a, 202b and second lead portions 207a, 207b are formed in a film by the use of the prior art film-deposition process through a single step and made of a material such as permalloy containing about 80% of nickel or a nickel-cobalt alloy. After being formed, these members can optionally be shaped into the configuration shown in FIG. 2 by the use of photolithography through etching or the like. In this case, a pattern such as that obtained by vapor deposition or etching is preferably one in which the first and second lead portions are respectively disposed symmetrically relative to a vertical line passing through the center of the MR element. Assuming that the MR element has a vertical height $W_s$, each of the first lead portions has a width $W_1$ and each of the second lead portions has a width $W_2$, all of these dimensions being defined in a direction perpendicular to the MR current which flows at the MR element, the first lead portions and the second lead portions for detecting signals, the whole configuration is designed to fulfill the following relationships:

$$W_s < W_1 \quad (1)$$

$$W_2 < W_1 \quad (2).$$

These two relationships are required to reduce noise and to increase output. The first relationship (1) means that thermal noise can be reduced by providing the lead portions with resistance as low as possible and that externally induced noise can be reduced by providing a smaller area of the MR element 201 bounded by the lead wires. In other words, the first relationship provides an advantage in that the resistance in the MR sensor section can be correspondingly increased by making the resistance in the lead portions and the area surrounded by the lead portions as small as possible in the scope of a predetermined track width 1 (FIG. 2). The second relationship (2) means that the resistance can be increased by making the sensor section as long as possible. It is preferred that the dimensions $W_s$ and $W_2$ be substantially equal to each other. If the width $W_2$ is larger than the height $W_s$, the width in the sensor would be decreased to reduce the output. On the contrary, if the width $W_2$ is smaller than the height $W_s$, there would be caused various problems in that the resistance in the lead wires is increased to promote thermal noise, that the current density is increased to cause disconnection, and so on.

The MR type magnetic head thus constructed has the following advantages: (1) The process for making it can be extremely simplified having only a single film-formation and optionally only a single etching operation since the sensor section and the first, second lead portions are formed in a single layer of film. (2) The magnetic characteristics can be easily controlled to reduce drastically the dispersion therein since the MR element is formed by the use of a film deposition process in a single step. (3) The magnetic characteristics will vary less since the MR element is shaped by the use of photolithography in a single step and therefore not affected by an etching liquid. As a result, the process for making MR type magnetic heads has very beneficial advantages in that the manufacturing cost is reduced, that the yield is improved, that the time required for production is shortened, and so on.

As described previously, the MR magnetic head formed in a single film forming step should have a resistance in the sensor section as high as possible in comparison with that in the lead sections for improving the signal-to-noise ratio. It is preferred that the resistance in the sensor section be as high as possible in a direction perpendicular to the magnetic recording medium within a distance corresponding to the wavelength $\lambda$ which is defined by a pair of magnetization lines oriented in the opposite directions as shown by 208 in FIG. 2.

Figures 3A, 3B:
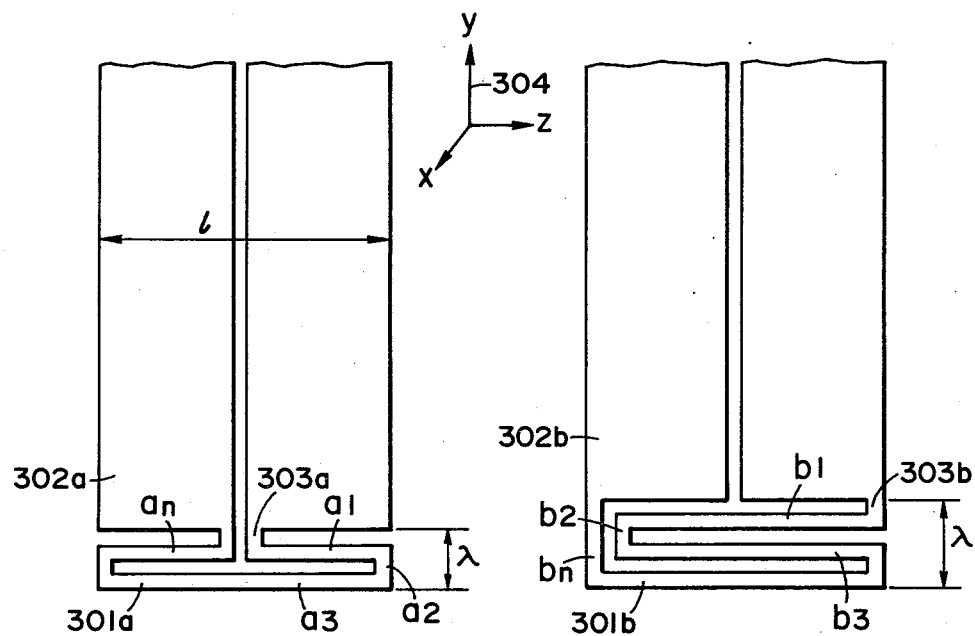
FIGS. 3A through 3D are plan views showing various embodiments of this invention in which MR type magnetic heads have different patterns.

For such a purpose, various patterns as shown in FIGS. 3A, 3B, 3C and 3D are proposed in accordance with this invention. In FIG. 3, a coordinate system is shown by 304, and each of the patterns is shown in the y-z plane. The direction in which the magnetic recording medium runs relative to the MR type magnetic head corresponds to the x direction which is perpendicular to the plane of the drawings. The y direction is vertical (longitudinal) and the z direction is horizontal (transverse). Reference numerals 301a–301d designate sensor portions, 302a–302d first lead portions and 303a–303d second lead portions. FIG. 3A shows a substantially rectangular pattern formed in the y direction within the distance from the sliding surface of the medium. This pattern includes a plurality of magnetic sensor portions a1, a2, . . . an and has a resistance about two times that of the sensor shown in FIG. 2, and is formed symmetrically relative to the central, longitudinal axis of the head.

Figures 3C, 3D:
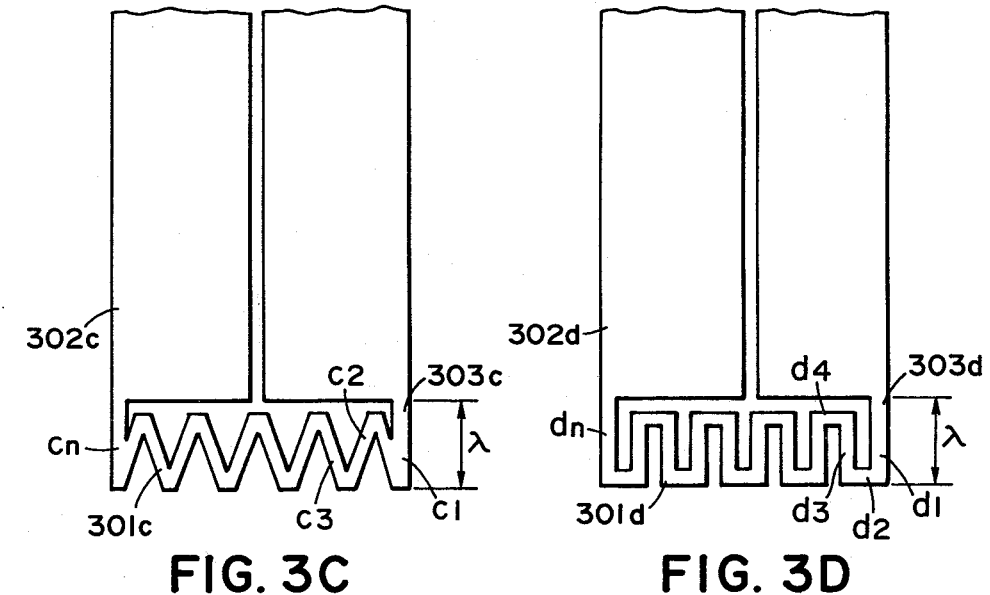

FIG. 3B. shows a pattern that has legs having relatively large length in the z direction legs having relatively small length in the y direction that connect to return legs in tha z direction. This pattern of FIG. 3B comprises a plurality of sensor portions b1, b2, . . . bn and exhibits a resistance in the sensor portions three time that of the pattern shown in FIG. 2. FIG. 3C shows a pattern which is repeated as a triangular wave shape in the z direction for increasing the resistance in the sensor section and includes a plurality of magnetic sensor portions c1, c2, . . . cn.

FIG. 3D shows a pattern which is repeated as a rectangular wave configuration to form a plurality of magnetic sensor portions d1, d2, . . . dn for increasing the sensitivity to signals in the y direction.

Although the preferred embodiments of this invention have been described with respect to the substrate including its plane on which the sensor is formed and which extends perpendicular to the recording medium, it is to be understood that similar results can be also obtained in such a substrate that is parallel to the recording medium.

What we claim is:

1. A magnetic reluctance effect type magnetic head comprising:

support means made of nonmagnetic material; and
   magnetic sensor means formed on said support means of magnetic reluctance effect material that varies in electric resistance in respone to a magnetic field, said magnetic sensor means being formed in a generally U-shape, having legs and a base contact, said legs of which define a pair of lead sections each having a width of $W_1$ at the top portion thereof and said base contact of which defines a plurality to triangular wave-like sections, connecting the bottom portions of said legs in series, each having a width of $W_s$; the width $W_1$ being greater than the width $W_s$.

2. A method for making a magnetic reluctance effect type magnetic head, said method comprising the steps of:

with a film deposition process, forming a film on a surface of support means made of a nonmagnetic material, said film being formed of a magnetic reluctance effect material that varies in electric resistance in response to a magnetic field; and
   shaping said film on said support means with the use of photolithography to provide a magnetic sensor means having a generally U-shape, comprising legs and a base contact section, said legs defining a pair of lead sections each having a width of $W_1$ at the top portion thereof, said contact section adapted to contact the sliding surface of a recording medium and having a width of $W_s$; the width $W_1$ being greater than the width $W_s$.

3. A method as defined in claim 2, wherein said shaping step comprises shaping said base contact section of said magnetic sensor means as a plurality of triangular wave-like sections.

* * * * *

UNITED STATES PATENT AND TRADEMARK OFFICE
CERTIFICATE OF CORRECTION

PATENT NO. : 4,438,470

DATED : March 20, 1984

INVENTOR(S) : TAKESHI SAWADA, ET AL.

It is certified that error appears in the above-identified patent and that said Letters Patent is hereby corrected as shown below:

Column 1

Line 20, change "firm" to --film--.

Line 32, change "nickel of" to --nickel or--.

Line 48, change "and copper" to --or copper--.

Column 2

Line 5, change "element" to --elements--.

Line 18, change "shapingthe" to --shaping the--.

Line 48, after "which" delete --in--.

Column 3

Line 4, change "head" to --lead--.

Column 4

Line 8, change "first, second" to --first and second--.

Line 52, change "3B." to --3B--.

Line 53, between "direction" and "legs" insert --,--.

UNITED STATES PATENT AND TRADEMARK OFFICE
CERTIFICATE OF CORRECTION

PATENT NO. : 4,438,470

DATED : March 20, 1984

INVENTOR(S) : TAKESHI SAWADA, ET AL.

It is certified that error appears in the above-identified patent and that said Letters Patent is hereby corrected as shown below:

Column 4 (Continued)

Line 55, change "tha" to --the--.

Line 58, change "time" to --times--.

Signed and Sealed this

Ninth Day of October 1984

[SEAL]

Attest:

GERALD J. MOSSINGHOFF

Attesting Officer

Commissioner of Patents and Trademarks